(12) United States Patent
Kurabayashi (10) Patent No.: US 10,909,224 B2
(45) Date of Patent: Feb. 2, 2021

(54) INFORMATION PROCESSING DEVICE, INFORMATION PROCESSING METHOD, AND PROGRAM FOR TAMPERING DETECTION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 204 days.

(21) Appl. No.: 15/978,967

(22) Filed: May 14, 2018

(65) Prior Publication Data

US 2018/0333644 A1    Nov. 22, 2018

Related U.S. Application Data

(63) Continuation of application No. PCT/JP2016/078271, filed on Sep. 26, 2016.

(30) Foreign Application Priority Data

Nov. 13, 2015   (JP) ................................. 2015-222674

(51) Int. Cl.
G06F 21/31 (2013.01)
A63F 13/214 (2014.01)
(Continued)

(52) U.S. Cl.
CPC ............ G06F 21/316 (2013.01); A63F 13/21 (2014.09); A63F 13/214 (2014.09); A63F 13/30 (2014.09);
(Continued)

(58) Field of Classification Search
None
See application file for complete search history.

(56) References Cited

U.S. PATENT DOCUMENTS

2005/0288103 A1   12/2005  Konuma
2010/0172052 A1    7/2010  Shibata
(Continued)

FOREIGN PATENT DOCUMENTS

JP    2002343074 A   11/2002
JP    4385863 B2     12/2009
(Continued)

OTHER PUBLICATIONS

Office Action issued in Japanese Application No. 2016-085337; dated Nov. 5, 2019 (2 pages).
(Continued)

Primary Examiner — Henry Tsang
(74) Attorney, Agent, or Firm — Osha Bergman Watanabe & Burton LLP (57) ABSTRACT

A method is disclosed that works effectively even in the case where a tampering detection method has become known to the public or in the case where program code for executing detection itself has been tampered with. A vibration-information obtaining unit obtains, from a player terminal, vibration history information representing a time series of the results of detection by a vibration detecting unit of the player terminal. An operation-information obtaining unit obtains, from the player terminal, operation history information representing a time series of the results of detection by a touch-operation input unit of the player terminal. An operation-information validity determining unit determines the validity of the operation history information obtained from the operation-information obtaining unit by comparing the operation history information with the vibration history information for which the validity has been determined by a vibration-information validity determining unit.

4 Claims, 7 Drawing Sheets

(51) Int. Cl.
    *A63F 13/21* (2014.01)
    *A63F 13/75* (2014.01)
    *G06F 21/64* (2013.01)
    *A63F 13/30* (2014.01)
    *G06F 21/44* (2013.01)
    *G06F 21/55* (2013.01)
    *G06F 1/16* (2006.01)
    *A63F 13/323* (2014.01)
    *A63F 13/79* (2014.01)
    *G06F 3/01* (2006.01)
    *G06F 3/0346* (2013.01)

(52) U.S. Cl.
    CPC ............ *A63F 13/323* (2014.09); *A63F 13/75* (2014.09); *A63F 13/79* (2014.09); *G06F 1/1694* (2013.01); *G06F 3/016* (2013.01); *G06F 3/0346* (2013.01); *G06F 21/44* (2013.01); *G06F 21/552* (2013.01); *G06F 21/64* (2013.01); *A63F 2300/535* (2013.01); *G06F 2200/1637* (2013.01)

(56) References Cited

U.S. PATENT DOCUMENTS

| | | | | |
|---|---|---|---|---|
| 2010/0328074 | A1* | 12/2010 | Johnson | G06F 21/31 340/573.1 |
| 2011/0248916 | A1* | 10/2011 | Griffin | G06F 3/016 345/157 |
| 2012/0191228 | A1 | 7/2012 | Osako | |
| 2012/0323348 | A1 | 12/2012 | Joo et al. | |
| 2013/0249831 | A1* | 9/2013 | Harris | G06F 3/0436 345/173 |
| 2013/0288647 | A1* | 10/2013 | Turgeman | H04W 12/06 455/411 |
| 2014/0104216 | A1* | 4/2014 | Adachi | G06F 3/041 345/173 |
| 2015/0264572 | A1* | 9/2015 | Turgeman | H04W 12/06 455/411 |
| 2015/0294097 | A1* | 10/2015 | Ramachandran | G06F 21/32 726/28 |
| 2016/0216824 | A1* | 7/2016 | Kies | G06F 3/0414 |
| 2016/0291704 | A1* | 10/2016 | Jackson | G06F 3/0383 |

FOREIGN PATENT DOCUMENTS

| | | |
|---|---|---|
| JP | 2012-155500 A | 8/2012 |
| JP | 2013-000587 A | 1/2013 |
| JP | 2013210934 A | 10/2013 |
| WO | 2009037970 A1 | 3/2009 |

OTHER PUBLICATIONS

Office Action issued in Japanese Application No. 2016-085337; dated Jun. 2, 2020 (3 pages).
International Search Report issued in PCT/JP2016/078271, dated Nov. 8, 2016 (1 page).
Written Opinion issued in PCT/JP2016/078271, dated Nov. 8, 2016 (3 pages).

\* cited by examiner

INFORMATION PROCESSING DEVICE, INFORMATION PROCESSING METHOD, AND PROGRAM FOR TAMPERING DETECTION

TECHNICAL FIELD

The present invention relates to information processing devices, information processing methods, and programs.

BACKGROUND ART

As games that can be executed on terminals such as smartphones, there are already existing games involving ranking functions for competitions among a plurality of players, functions for battles between players, and functions for battles between groups of players (e.g., see Patent Literature 1).

In such games, there is a problem related to the presence of players who conduct acts of tampering with program code, data saved in terminals, or data that is sent to a server via a network, such as the act of tampering with an operation history to fake as if the player has gained a high score, the act of acquiring items illegitimately, or the act of tampering with the number of items to acquire a large number of rare items (e.g., see Patent Literature 2).

Hereinafter, these kinds of acts will be collectively referred to as "the acts of tampering with or otherwise interfering with operation histories". Furthermore, players who conduct the acts of tampering with or otherwise interfering with operation histories will be referred to as "tamperers".

Such acts of tampering with or otherwise interfering with operation histories are problems that apply to information processing in general without limitation to games.

Various methods of countermeasure technologies against the acts of tampering with or otherwise interfering with operation histories have already been proposed. Typical methods include a method of detecting tampering with binary data of application software and a method of detecting tampering with a storage or a memory area involved in read/write operations by application software.

CITATION LIST

Patent Literature

{PTL 1}
Japanese Unexamined Patent Application, Publication No. 2013-587
{PTL 2}
Publication of Japanese Patent No. 4385863

SUMMARY OF INVENTION

Technical Problem

However, these existing methods for countermeasure technologies against the acts of tampering with or otherwise interfering with operation histories have not worked effectively in the case where the tampering detection method has become known to the public or in the case where program code for executing detection itself has been tampered with.

Accordingly, there is a demand for a new countermeasure technology against the acts of tampering with or otherwise interfering with operation histories, which works effectively even in the case where the tampering detection method has become known to the public or in the case where program code for executing detection itself has been tampered with.

The present invention has been made in view of the situation described above, and it is an object thereof to establish, in new countermeasure technologies against the acts of tampering with or otherwise interfering with operation histories, a method that works effectively even in the case where the tampering detection method has become known to the public or in the case where program code for executing detection itself has been tampered with.

Solution to Problem

In order to achieve the above object, an information processing device according to an aspect of the present invention includes:

a first detecting unit that detects a vibration that occurs on the terminal;

a display unit that displays an image on a predetermined display surface;

a second detecting unit that is laid over the display surface and that detects contact with an object by using a predetermined method; and an executing unit that executes predetermined processing on the basis of a touch operation performed by bringing the object into contact, the information processing device including:

a first obtaining means for obtaining vibration history information representing a time series of results of detection by the first detecting unit from the terminal;

a second obtaining means for obtaining operation history information representing a time series of touch operations from the terminal; and a first determining means for determining the validity of the operation history information by comparing the operation history information with the vibration history information.

An information processing method and a program according to an aspect of the present invention are an information processing method and a program corresponding to the information processing device according to the above-described aspect of the present invention.

Advantageous Effects of Invention

The present invention makes it possible, in new countermeasure technologies against the acts of tampering with or otherwise interfering with operation histories, to establish a method that works effectively even in the case where the tampering detection method has become known to the public or in the case where program code for executing detection itself has been tampered with.

DESCRIPTION OF EMBODIMENTS

An embodiment of the present invention will be described below with reference to the drawings.

Figure 1:
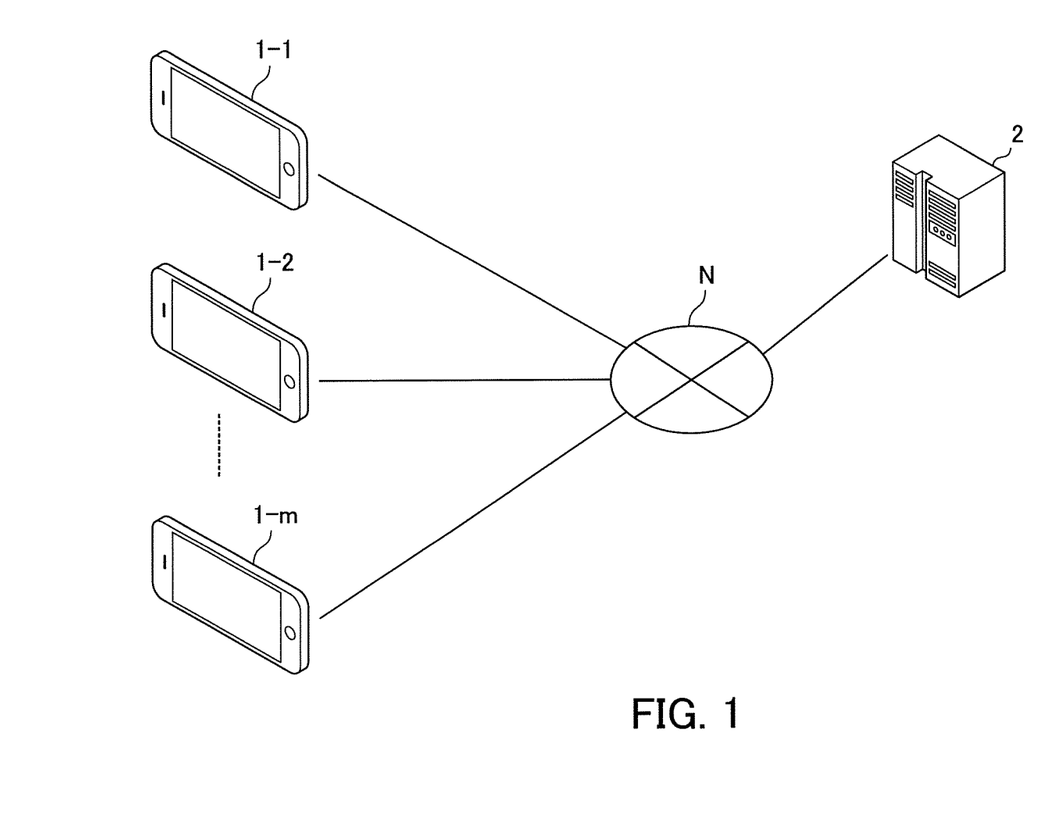
FIG. 1 is a block diagram showing the configuration of an information processing system according to an embodiment of the present invention.

FIG. 1 shows the configuration of an information processing system according to an embodiment of the present invention.

The information processing system shown in FIG. 1 is a system including player terminals 1-1 to 1-m individually used by m players (m is an arbitrary integer greater than or equal to 1) and also including a server 2. The individual player terminals 1-1 to 1-m and the server 2 are connected to each other via a predetermined network N, such as the Internet.

The server 2 provides the individual player terminals 1-1 to 1-m with a game execution environment to provide various services relating to a game that is executed at the individual player terminals 1-1 to 1-m.

Each of the player terminals 1-1 to 1-m is implemented by a smartphone or the like operated by each player and executes various kinds of processing, such as executing a game.

Hereinafter, in the case where there is no need for distinction among the individual player terminals 1-1 to 1-m, these will be referred to collectively as "player terminals 1".

Figure 2:
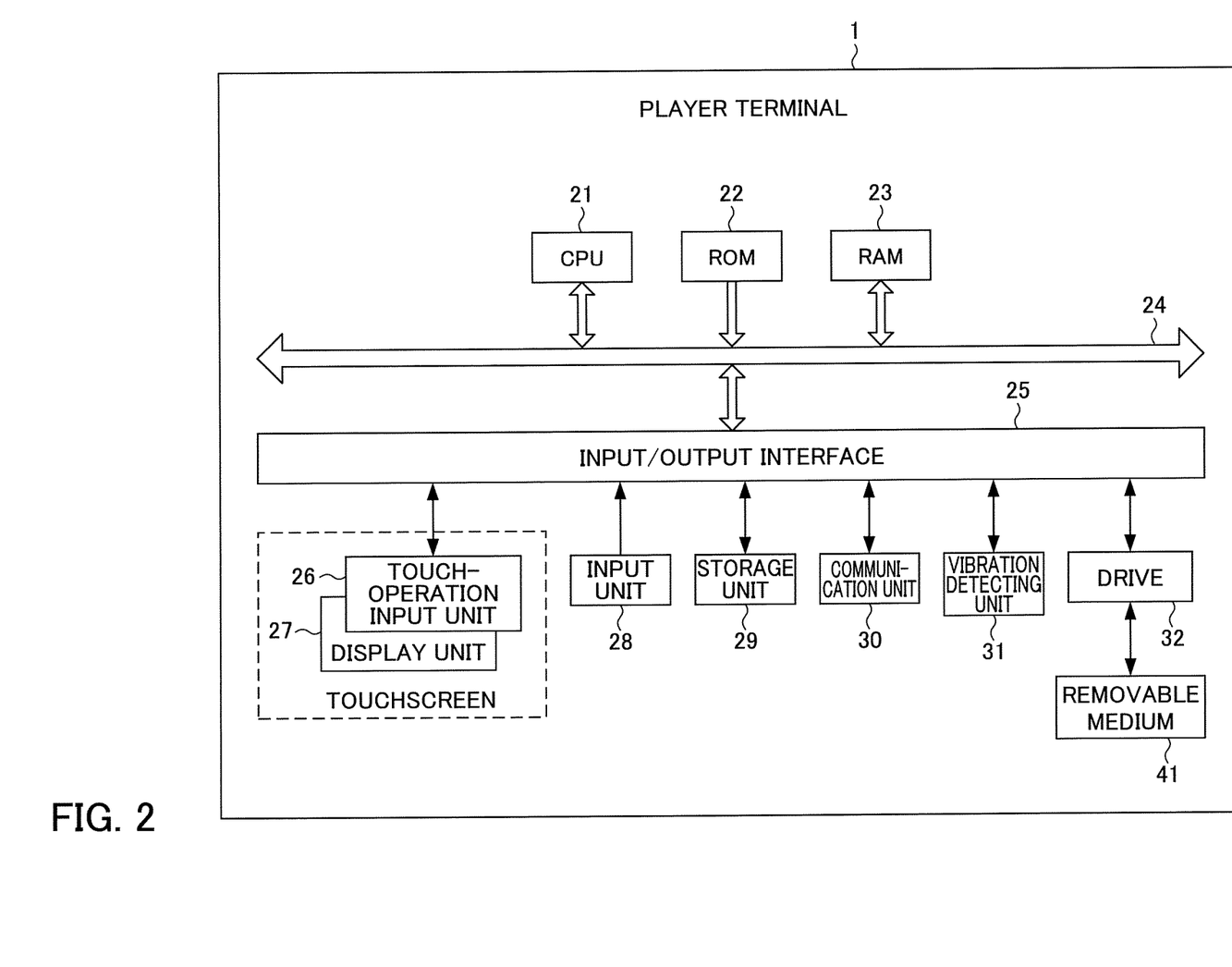
FIG. 2 is a block diagram showing, in the information processing system in FIG. 1, the hardware configuration of a player terminal as an embodiment of a terminal according to the present invention.

FIG. 2 is a block diagram showing, in the information processing system in FIG. 1, the hardware configuration of a player terminal 1.

As described above, the player terminal 1 is implemented by a smartphone or the like.

The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, a vibration detecting unit 31, and a drive 32.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, the vibration detecting unit 31, and the drive 32 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed.

The touch operation here refers to bringing an object into contact with the touch-operation input unit 26. What is brought into contact with the touch-operation input unit 26 is, for example, a player's finger or a stylus.

The display unit 27 is implemented by a display, such as a liquid crystal display, and displays various kinds of images, such as images related to the game.

As described above, in this embodiment, a touchscreen is constituted of the touch-operation input unit 26 and the display unit 27.

Here, examples of the kinds of touch operations performed on the touchscreen include tap, swipe, and flick.

Tap is an operation in which an object is brought into contact with a predetermined area on the display surface and is then released from the same area as the predetermined area.

Furthermore, swipe and flick refer to a series of operations going through a first state, in which an object has begun to be brought into contact with the display medium, a second state, in which the position of the object is changed while the object is maintained in contact with the display medium (a second state in which the touched position moves), and a third state, in which the object is released from contact with the display medium (a third state, in which the object is moved away from the display medium).

As will be described later, when these touch operations are performed on the touchscreen of the player terminal 1, a vibration occurs at the player terminal 1.

The input unit 28 is constituted of various kinds of hardware buttons, etc. and allows input of various kinds of information in accordance with instruction operations performed by the player.

The storage unit 29 is implemented by a DRAM (Dynamic Random Access Memory) or the like and stores various kinds of data.

The communication unit 30 controls communications carried out with other devices (the server 2 and the other player terminals 1 in the example in FIG. 1) via the network N, including the Internet.

The vibration detecting unit 31 detects a vibration that has occurred due to a touch operation performed on the touchscreen. For example, in the case where the player terminal 1 is implemented by a smartphone, the vibration detecting unit 31 is implemented by an acceleration sensor built into the smartphone.

More precisely, the acceleration sensor detects three-axis acceleration components by means of a piezo-resistive or capacitive detection mechanism and outputs acceleration data for the individual three-axis components representing the detection results. Then, the server 2 or the like recognizes the vibration on the player terminal 1 on the basis of the acceleration data. Note, however, that, in this description, such acceleration data is considered as a kind of vibration information since it enables recognition of vibration. That is, in this description, vibration detection is a broad concept encompassing detection of information that enables recognition of vibration (e.g., acceleration) as well as detection of vibration itself.

The drive 32 is provided as needed. A removable medium 41 implemented by a magnetic disk, an optical disk, a magneto-optical disk, a semiconductor memory, or the like is loaded in the drive 32 as appropriate. A program read from the removable medium 41 by the drive 32 is installed in the storage unit 29 as needed. The removable medium 41 can also store various kinds of data stored in the storage unit 29, similarly to the storage unit 29.

Figure 3:
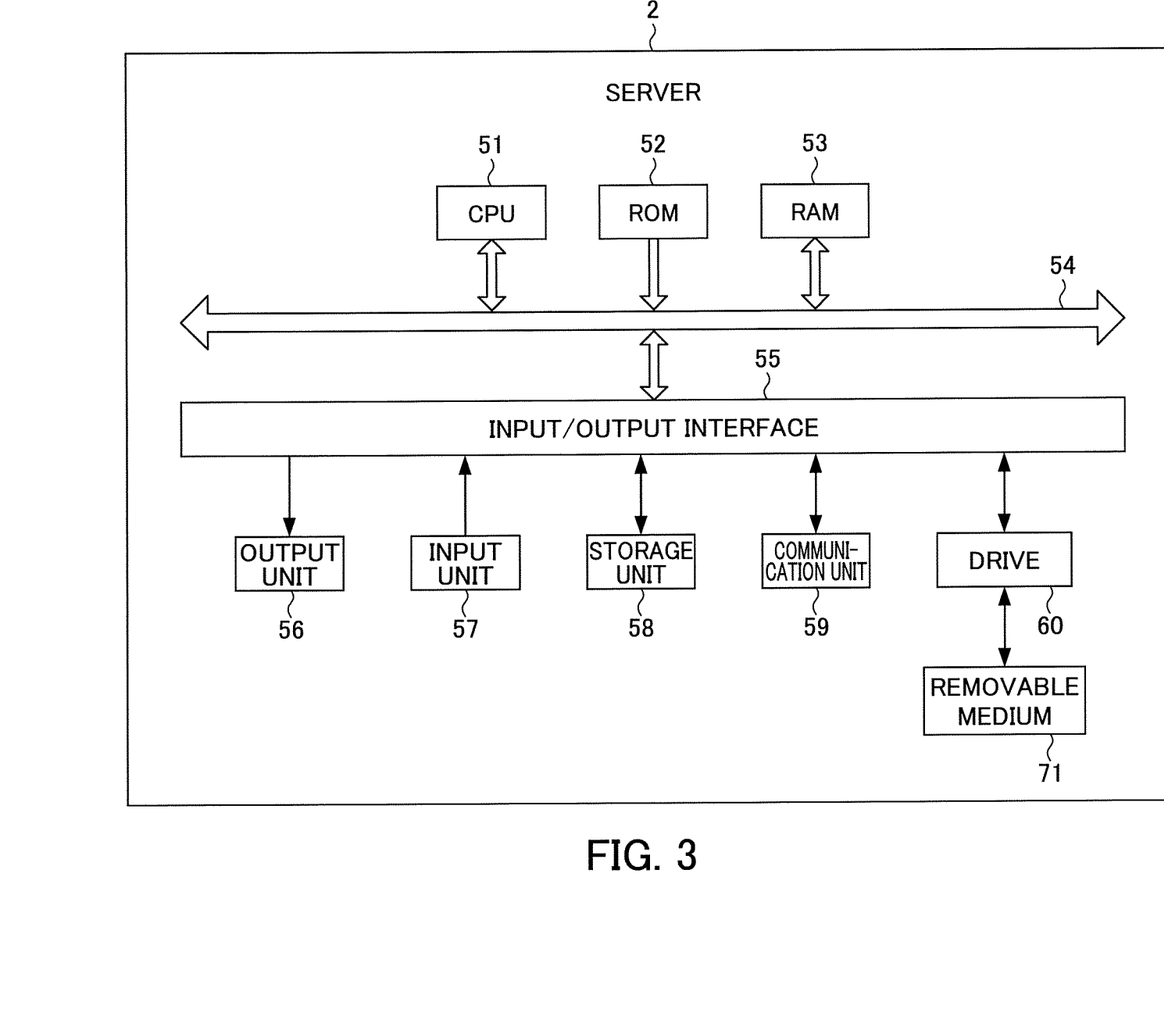
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of an information processing device according to the present invention.

The server 2 includes a CPU 51, a ROM 52, a RAM 53, a bus 54, an input/output interface 55, an output unit 56, an input unit 57, a storage unit 58, a communication unit 59, and a drive 60.

Since the configuration of the server 2 is basically the same as that of the player terminal 1 with the vibration detecting unit 31 and the touchscreen thereof removed, a description thereof will be omitted here.

Through cooperation between the above-described various kinds of hardware and various kinds of software of the player terminal 1 in FIG. 2 and the server 2 in FIG. 3, it becomes possible to execute a game on the player terminal 1.

Specifically, the information processing system in this embodiment can execute various kinds of control in relation to a game in which a plurality of players can participate, such as a multi-battle game. In particular, the information processing system can execute the following control as control for detecting an act of tampering with or otherwise interfering with an operation history or a risk thereof (hereinafter referred to as "operation-history tampering detection control").

Specifically, many tamperers employ a program for automatically performing a touch operation without involving any operation by a actual person (player) by letting a computer determine a position and timing at which the touch operation is to be performed, thereby tampering with or falsifying information relating to a touch operation on a smartphone, whereby an operation history is tampered with or otherwise interfered with. Therefore, operation data of a tamperer differs from information relating to a legitimate touch operation physically entered by a actual person.

Thus, if it can be detected whether or not a touch operation is a legitimate touch operation physically entered by a actual person, it is possible to detect an act of tampering with or otherwise interfering with an operation history or to detect the risk thereof.

When a touch operation is performed on the touchscreen of the player terminal 1, a very small vibration is necessarily applied to the main unit of the player terminal 1. If this vibration can be detected, it becomes possible to detect whether or not the touch operation is a legitimate touch operation physically entered by a actual person.

Specifically, in the case where the player terminal 1 is a smartphone, the player terminal 1 has a built-in acceleration sensor. Time-series information represented by the output values (or processed values thereof) from the acceleration sensor makes it possible to recognize whether or not the player terminal 1 has vibrated and the magnitude of vibration if the player terminal 1 has vibrated.

Furthermore, also in the case where the vibration detecting unit 31 implemented by a device other than an acceleration sensor is included in the player terminal 1, time-series information representing the results of detection by the vibration detecting unit 31 makes it possible to recognize whether or not the player terminal 1 has vibrated and, if the player terminal 1 has vibrated, the magnitude of the vibration.

Thus, hereinafter, time-series information representing the results of detection by the vibration detecting unit 31, including an acceleration sensor, will be referred to as "vibration history information".

By utilizing the vibration history information, it becomes possible to detect whether or not a touch operation is a legitimate touch operation physically entered by a actual person. The reason for this is as follows. The values output from the vibration detecting unit 31 are obtained by observing physical phenomena. The values from the vibration detecting unit 31 are determined according to various factors, such as the manner of holding the player terminal 1, the size and weight of the main unit of the player terminal 1, and the kind of the vibration detecting unit 31 installed in the player terminal 1. Therefore, it is difficult to accurately and automatically reproduce a history of values output from the vibration detecting unit 31 by using a program.

Hereinafter, a description will be given by using time-series information representing the results output from an acceleration sensor as an example of the vibration history information.

To sum up what has been described above, the following control processing is executed in the operation-history tampering detection control in this embodiment. Specifically, the player terminal 1 (smartphone) detects a vibration that occurs when a touch operation is performed on the touchscreen thereof by using the acceleration sensor (the vibration detecting unit 31) of the smartphone and sends time-series information representing the detection results as vibration history information to the server 2. That is, the server 2 obtains the time-series information representing the results of detection by the acceleration sensor of the player terminal 1 as vibration history information of the player terminal 1.

Furthermore, the server 2 obtains information representing a history of touch operations on the player terminal 1 (hereinafter referred to as "operation history information").

Then, the server 2 compares the operation history information with the vibration history information to distinguish whether the operation history information is information relating to a legitimate touch operation physically entered by a actual person or information automatically generated or tampered with by a program or the like. That is, the server 2 can check the validity of the operation history information relating to a touch operation, which can be easily tampered with or falsified, by using vibration history information, which is difficult to tamper with or falsify.

Here, as described earlier, it is difficult with a program or the like to simulate the results of detection by the acceleration sensor arising from a touch operation physically entered by a actual person. However, it cannot be said that it is impossible to simulate the results with a program or the like.

Thus, in this embodiment, the server 2 stores information that serves as indices for determining whether or not vibration history information is valid (hereinafter referred to as "indices information"). The indices information in this embodiment is generated on the basis of vibration history information derived from the results of detection by the acceleration sensor arising from touch operations physically entered by actual persons.

Furthermore, the server 2 compares the vibration history information sent from the player terminal 1 with the indices information to check the validity of the vibration history information.

As described above, in this embodiment, validation is performed in two steps by using two different kinds of information sources, namely, vibration history information and operation history information; specifically, the validity of the vibration history information is checked first, and then the validity of the operation history information is checked. That is, the server 2 can check the validity of operation history information relating to a touch operation, which can be easily tampered with or falsified, by using vibration history information that has been validated as not having been tampered with or falsified.

The operation-history tampering detection control will be further described below with reference to FIGS. 4A, 4B and 5.

Figure 4A:
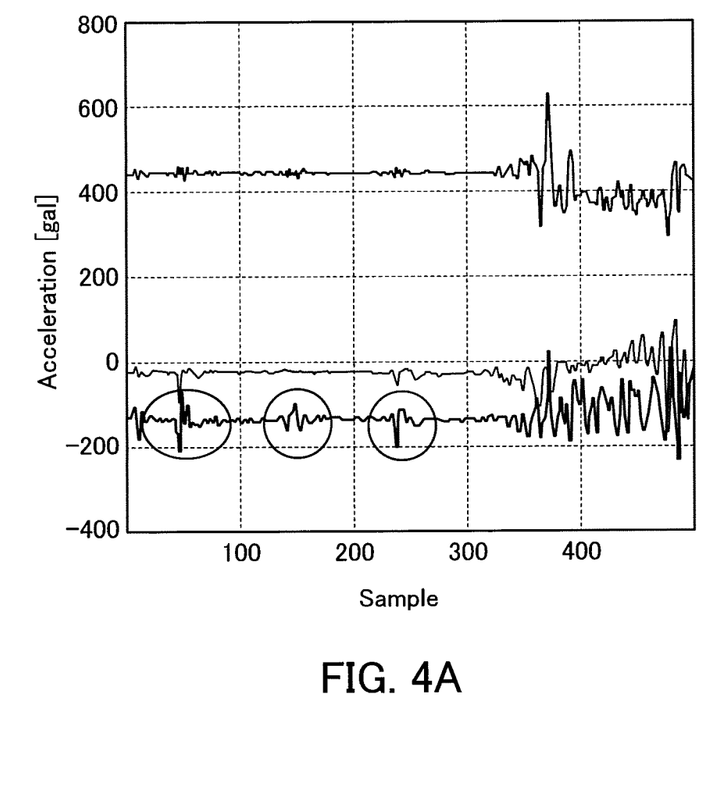
FIG. 4A shows timing charts representing the results of detection by an acceleration sensor of the player terminal in FIG. 2.
Figure 4B:
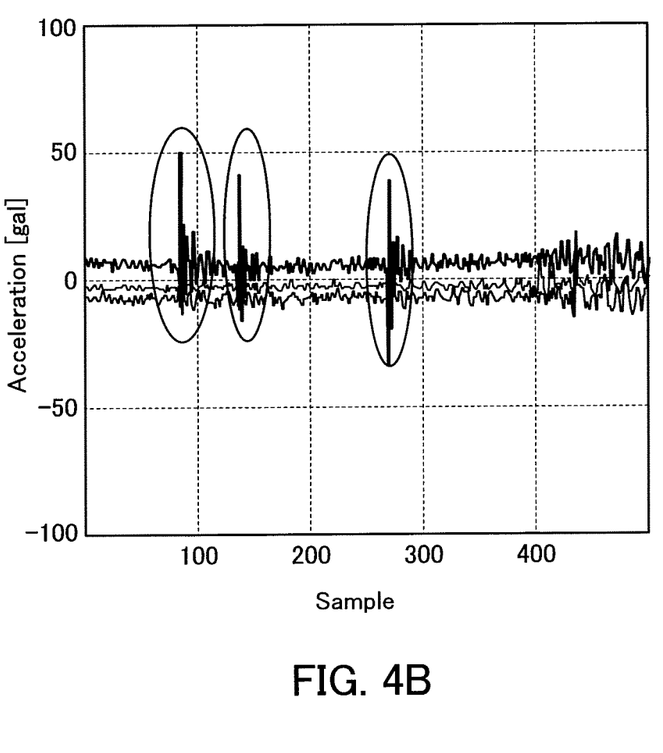
FIG. 4B shows timing charts representing the results of detection by an acceleration sensor of the player terminal in FIG. 2.

FIGS. 4A and 4B are a timing chart showing the detection results in a case where vibrations that occurred due to tap operations on the touchscreen of the player terminal 1 were detected by using the acceleration sensor (the vibration detecting unit 31) of the player terminal 1.

In order to execute the operation-history tampering detection control in this embodiment, it is necessary to accurately detect very small vibrations that occur when touch operations are performed on the touchscreen of the player terminal 1. For this purpose, it is a prerequisite that the acceleration sensor of the player terminal 1 have a sufficient resolution. FIGS. 4A and 4B show the result of investigation by the inventor as to whether or not this prerequisite is satisfied.

Specifically, FIG. 4A is a timing chart for a case where taps were performed three times by an experimenter with the player terminal 1 held in his/her hand. FIG. 4B is a timing chart for a case where taps were performed three times by the experimenter with the player terminal 1 placed on a desk.

Note that although the results of detection by the acceleration sensor are drawn as analog data in the form of continuous curves in the example in FIGS. 4A and 4B, actually, the values of acceleration along the individual axes are obtained every 10 milliseconds. In the case where an ordinary smartphone currently available on the market is adopted as the player terminal 1, the acceleration sensor built into the smartphone has a measurement frequency of 100 Hz (100 times per second), and thus the values of acceleration are obtained every 10 milliseconds.

As indicated inside the three elliptical frames in FIGS. 4A and 4B, it is understood that the three tap operations on the touchscreen of the player terminal 1 were successfully detected as variations in the (acceleration) output level (magnitude variations) of the acceleration sensor of the player terminal 1.

Note that the very small repeated magnitude variations at the ends in FIGS. 4A and 4B (the waveforms at and after the sample value 300 along the horizontal axis) are vibrations due to screen capture operations and are irrelevant to touch operations.

The greatest difference between a vibration that occurs when a tap operation is performed with the player terminal 1 held in the hand and a vibration that occurs when a tap operation is performed with the player terminal 1 placed on the desk is the magnitude of variations in the output level of the acceleration sensor.

Specifically, the magnitude of variations in the output level of the acceleration sensor when the player terminal 1 was held in the hand, shown in FIG. 4A, exhibits a fluctuation in a range of 0 gal to 200 gal. Meanwhile, the magnitude of variations in the output level of the acceleration sensor when tap operations were performed with the player terminal 1 placed on the desk, shown in FIG. 4B, is 0 gal to 50 gal.

Here, 1 gal is the magnitude of acceleration of 1 centimeter per second squared ($cm/s^2$). Considering that the gravitational acceleration that occurs when the player terminal 1 is dropped is 981 gal, it is understood that the acceleration sensor of the player terminal 1 captured extremely small changes in acceleration.

From what has been described above, it has been validated that the prerequisite for executing the operation-history tampering detection control in this embodiment, i.e., the prerequisite that the acceleration sensor of the player terminal 1 have a resolution high enough to accurately detect very small vibrations that occur when touch operations are performed on the touchscreen of the player terminal 1, is satisfied.

Figure 5:
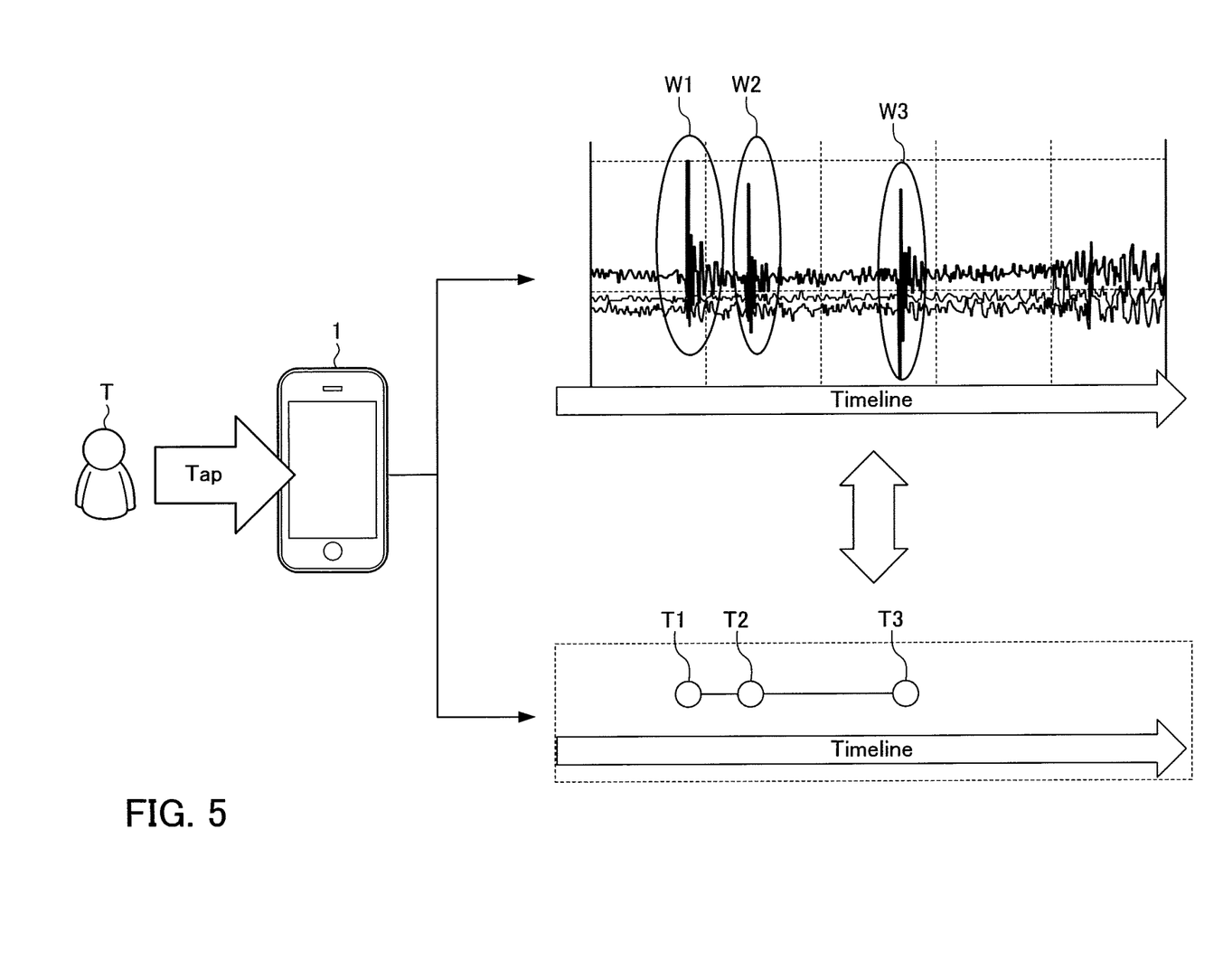
FIG. 5 is a diagram showing how the validity of operation history information of the player terminal is checked by comparing the operation history information with validated vibration history information.

FIG. 5 is an illustration showing how the validity of the operation history information of the player terminal 1 is checked by comparing it with already validated vibration history information.

Shown at the upper right is a timing chart (i.e., vibration history information) representing the results of detection by the acceleration sensor (the vibration detecting unit 31) built into the player terminal 1 in a case where tap operations were performed three times on the touchscreen of the player terminal 1. Shown at the lower right is operation history information associated with a tap operation on the player terminal 1.

The vibration history information (upper right) is constituted of individual timing charts for the acceleration along the x axis, the acceleration along the y axis, and the acceleration along the z axis, output from the acceleration sensor built into the player terminal 1. In the example in FIG. 5, similarly to the example in FIGS. 4A and 4B, although the vibration history information is drawn as analog data in the form of continuous curves, actually, the values of acceleration along the individual axes are obtained every 10 milliseconds. In the case where an ordinary smartphone currently available on the market is adopted as the player terminal 1, the acceleration sensor (the vibration detecting unit 31) built into the smartphone has a measurement frequency of 100 Hz (100 times per second), and thus the values of acceleration are obtained every 10 milliseconds. Specifically, for example, the data structure of vibration history information A is defined as in expression (1) below.

$$A:=\{x1,y1,z1,x2,y2,z2,\ldots,xm,ym,zm\} \quad (1)$$

Here, the acceleration sensor measures accelerations at a constant frequency, and $xk$, $yk$, and $zk$ (k is an integer from 1 to m) respectively signify the acceleration along the x axis, the acceleration along the y axis, and the acceleration along the z axis, measured at timing k. That is, the timing m signifies the latest measurement results.

The operation history information is information representing the timings at which the player T performed touch operations on the player terminal 1.

Specifically, information about each input event, constituted of a position along the x axis and a position along the y axis, is obtained from the touchscreen. Such input event information is stored in a memory or a secondary storage of the player terminal 1. Information including time information (information representing the time of the occurrence of each input event) as well as the input event information is adopted as operation history information. Specifically, for example, the data structure of operation history information T is defined as in expression (2) below.

$$A := \{x1, y1, t1, x2, y2, t2, \ldots, xn, yn, zn\} \quad (2)$$

Here, xp, yp, and tp (p is an integer from 1 to n) respectively signify the position along the x axis and the position along the y axis, measured at the timing p, and the time at which these positions were recorded. As described above, as opposed to vibration history information, since the history (individual elements) of input event information is recorded at the timing of input by the user, information in which time information is also recorded for each event is adopted as the operation history information.

In the vibration history information (upper right in FIG. 5) representing the results of detection by the acceleration sensor of the player terminal 1, it is understood that variations (magnitude variations) in the (acceleration) output levels of the acceleration sensor are clearly indicated in a waveform W1 at the time of the first tap, a waveform W2 at the time of the second tap, and a waveform W3 at the time of the third tap. Each of the waveforms W1, W2, and W3 is a set of the plurality of element data xk, yk, and zk in the vibration history information A in expression (1) given earlier.

Furthermore, in the operation history information (lower right in FIG. 5) of the player terminal 1, it is understood that there exist event information T1 representing the first tap, event information T2 representing the second tap, and event information T3 representing the third tap. Each of the event information T1, T2, and T3 is a single set of element data xp, yp, and tp in the operation history information T in expression (2) given earlier.

Here, the time axes (horizontal axes) for the vibration history information A (upper right in FIG. 5) and the operation history information T (lower right in FIG. 5) coincide with each other. Furthermore, it is understood that the individual timings of the occurrence (positions along the time axis) of the waveforms W1, W2, and W3 in the vibration history information A and the individual timings of the occurrence (positions along the time axis) of the event information T1, T2, and T3 in the operation history information T substantially coincide with each other.

As described above, it is understood that it is possible to check the validity of the operation history information T on the basis of the vibration history information A by comparing the operation history information T (lower right in FIG. 5) with the vibration history information A (upper right in FIG. 5) that has already been validated.

In other words, by confirming that the timings at which changes in the accelerations (vibration) in the vibration history information A occurred and the timings of the occurrence of events in the operation history information T substantially coincide with each other, it is possible to validate that each of the events represented by the operation history information T is based on a legitimate touch operation physically entered by a actual person.

Figure 6:
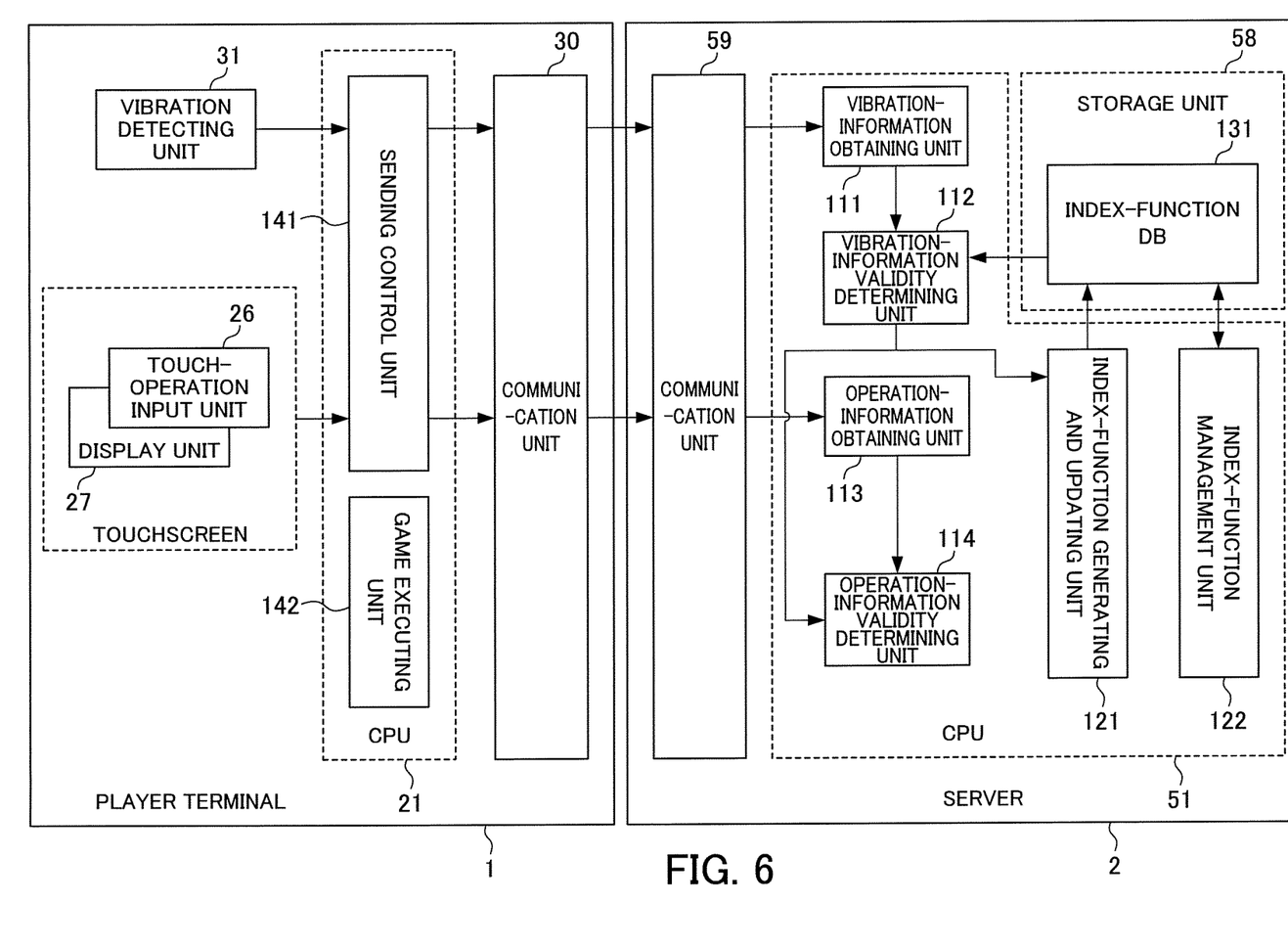
FIG. 6 is a functional block diagram showing, in the functional configurations of the player terminal in FIG. 2 and the server in FIG. 3, an example of functional configurations for executing the operation-history tampering detection control.

In order to execute the operation-history tampering detection control described above with reference to FIGS. 4A, 4B and 5, the player terminal 1 in FIG. 2 and the server 2 in FIG. 3 have the functional configurations shown in FIG. 6.

FIG. 6 is a functional block diagram showing, in the functional configurations of the player terminal 1 and the server 2, an example of functional configurations for executing the operation-history tampering detection control.

As shown in FIG. 6, the CPU 21 of the player terminal 1 has the functions of a sending control unit 141 and a game executing unit 142.

The game executing unit 142 executes a certain game. It is assumed that the game requires touch operations on the touchscreen.

The sending control unit 141 controls sending, via the communication unit 30, of the vibration history information output from the vibration detecting unit 31. Furthermore, the sending control unit 141 controls sending, via the communication unit 30, of the operation history information on the touchscreen.

Furthermore, as shown in FIG. 6, the CPU of the server 2 has the functions of a vibration-information obtaining unit 111, a vibration-information validity determining unit 112, an operation-information obtaining unit 113, an operation-information validity determining unit 114, an index-function generating and updating unit 121, and an index-function management unit 122.

The storage unit 58 of the server 2 has the function of an index-function DB 131.

The vibration-information obtaining unit 111 obtains, via the communication unit 59, vibration history information representing time-series results of detection by the vibration detecting unit 31 of the player terminal 1 from the player terminal 1.

The vibration-information validity determining unit 112 determines the validity of the vibration history information obtained by the vibration-information obtaining unit 111 on the basis of the index function managed by the index-function management unit 122.

Here, the index function refers to a function that outputs information indicating a result of determination as to whether or not a vibration represented by vibration history information is a vibration based on a touch operation performed by a actual person or information that makes it possible to derive the result of determination.

Therefore, any function having such properties may be adopted as an index function.

As an example, a function for just confirming that the output of the acceleration sensor, represented by the vibration history information, is not changing linearly may be adopted as an index function.

As another example, since the vibration history information is time-series information representing the results of detection by the acceleration sensor, a function derived by using a model defining feature quantities of accelerations, obtained when actual persons actually performed touch operations in the past, may be adopted as an index function.

Specifically, a pattern recognition model employing supervised learning, such as a support vector machine, or a machine learning algorithm, such as random forest, may be applied to a set of vibration history information relating to touch operations performed by actual persons, thereby outputting a function for distinguishing between vibration history information associated with a actual person and vibration history information that has been automatically generated or tampered with, and this function may be adopted as an index function.

That is, an index function may be generated on the basis of validated vibration history information among vibration history information obtained in the past, which may be stored in the index-function DB 131.

The method and place of generating the index function is not particularly limited. In the method adopted in this embodiment, an index function is generated by the index-function generating and updating unit 121 provided in the server 2, as will be described later. Alternatively, for example, it is possible to accumulate legitimate and illegitimate vibration history information gathered from the player terminals 1 of players on the server 2 side in the form of what is called big data and to employ a classification method based on machine learning using the vibration-history big data (motion big data). Specifically, in this embodiment, the vibration-information validity determining unit 112 inputs the acceleration sensor values at individual timings, represented by the vibration history information obtained by the vibration-information obtaining unit 111, to the index function stored in the index-function DB 131, and checks whether or not the values of the acceleration sensor at the individual timings, represented by the vibration history information, are natural as touch operations performed by a actual person. That is, vibration history information validated as being natural as touch operations performed by a actual person serves as validated vibration history information.

The operation-information obtaining unit 113 obtains operation history information representing a time-series of touch operations on the player terminal 1 from the player terminal 1 via the communication unit 59.

The operation-information validity determining unit 114 determines the validity of the operation history information obtained by the operation-information obtaining unit 113 by comparing the operation history information with the vibration history information that has been validated by the vibration-information validity determining unit 112.

Specifically, the operation-information validity determining unit 114 confirms that the input event history associated with touch operations, represented by the operation history information, has not been tampered with by comparing the input event history with the values of the acceleration sensor at the individual timings, represented by the validated vibration history information.

More specifically, for example, the operation-information validity determining unit 114 can confirm that the input event history has not been tampered with by using a function for confirming that changes in accelerations associated with the times at which touch operations were performed occurred simultaneously with the input history events.

The index-function generating and updating unit 121 generates or updates an index function by using vibration history information validated in the past.

Specifically, the index-function generating and updating unit 121 generates or updates an index function on the basis of the feature quantities of accelerations detected in relation to touch operations performed by actual persons on the player terminals 1. As described earlier, the method of generation or updating is not particularly limited; however, it is preferable to adopt a method employing machine learning or the like so that an index function can be updated to a suitable one.

The index-function management unit 122 manages the index function generated or updated by the index-function generating and updating unit 121 as described above by storing the index function in the index-function DB 131.

The functional configurations of the player terminal 1 and the server 2 for realizing the operation-history tampering detection control have been described above.

Next, the flow of operation-history tampering detection processing executed by the server 2 having the above-described functional configuration will be described with reference to FIG. 7.

Figure 7:
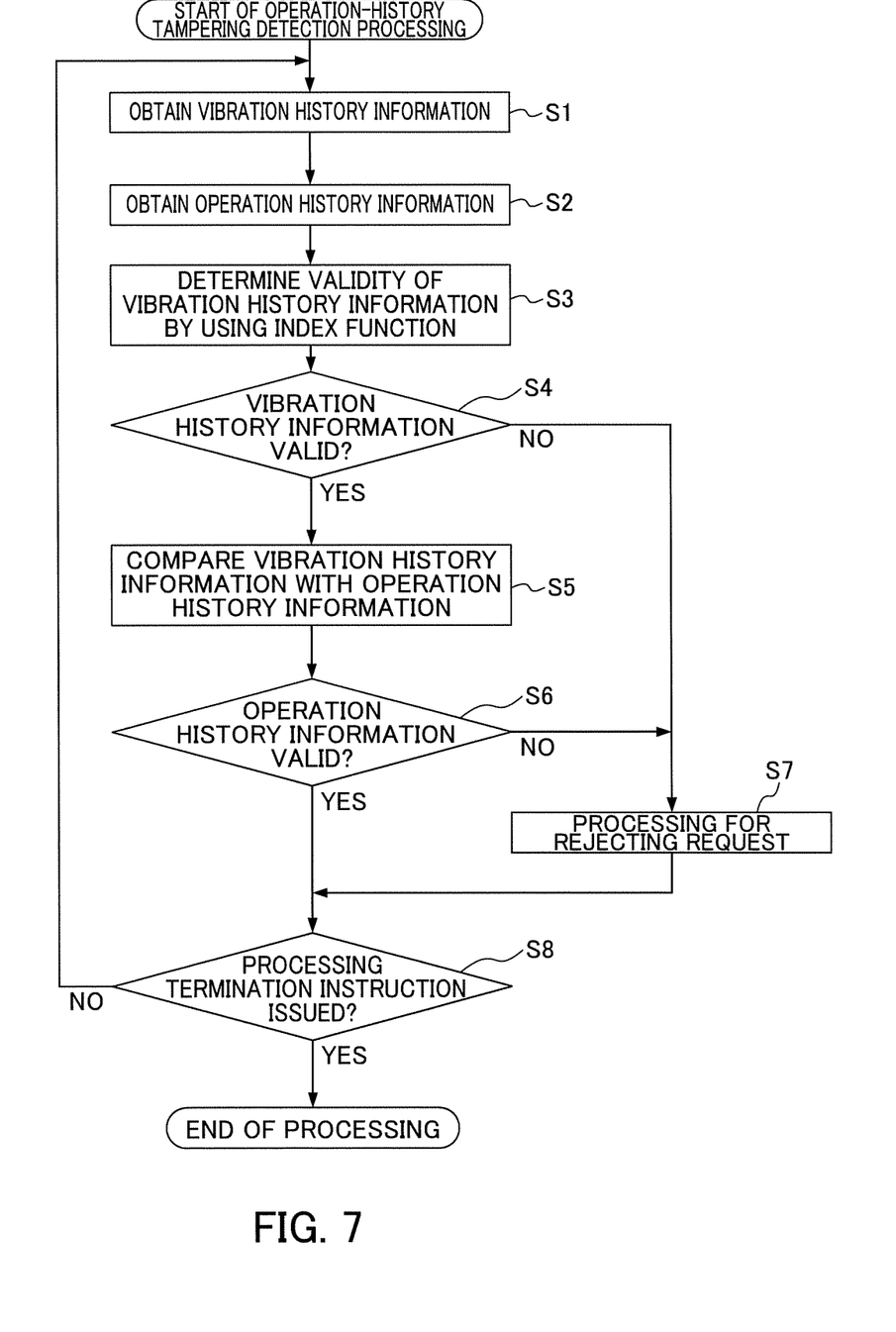
FIG. 7 is a flowchart for explaining an example of the flow of operation-history tampering detection processing executed by the server having the functional configuration in FIG. 6.

FIG. 7 is a flowchart for explaining the flow of the operation-history tampering detection processing by the server 2.

In step S1, the vibration-information obtaining unit 111 of the server 2 obtains, from the player terminal 1, vibration history information representing a time-series of detection by the vibration detecting unit 31.

In step S2, the operation-information obtaining unit 113 obtains, from the player terminal 1, operation history information representing a time-series of detection of touch operations.

In step S3, the vibration-information validity determining unit 112 determines the validity of the vibration history information obtained through the processing in step S1 by using the index function managed by the index-function management unit 122.

In step S4, the vibration-information validity determining unit 112 determines whether or not the vibration history information obtained through the processing in step S1 is valid on the basis of the result of determination in step S3.

In the case where it is determined that the vibration history information is not valid, i.e., in the case where it is determined that the vibration history information may have been tampered with or otherwise interfered with by a program or the like, the determination in step S4 results in NO, and the processing proceeds to step S7.

In step S7, the vibration-information validity determining unit 112 executes processing for rejecting a request. Here, the request refers to a request such as the invocation of a command by way of a combination of touch operations identified from operation history information. Then, the processing proceeds to step S8. The processing in step S8 and the subsequent steps will be described later.

Meanwhile, in the case where it is determined that the vibration history information is valid, the determination in step S4 results in YES, and the processing proceeds to step S5.

In step S5, the operation-information validity determining unit 114 compares the operation history information obtained through the processing in step S2 with the vibration history information validated in steps S3 and S4.

In step S6, the operation-information validity determining unit 114 determines whether or not the operation history information is valid.

In the case where it is determined that the operation history information is not valid, i.e., in the case where it is determined that the operation history information may have been tampered with or otherwise interfered with by a program or the like, the determination in step S6 results in NO, and the processing proceeds to step S7.

In step S7, the vibration-information validity determining unit 112 executes processing for rejecting a request. Then, the processing proceeds to step S8. The processing in step S8 and the subsequent steps will be described later.

Meanwhile, in the case where it is determined that the operation history information is valid, the determination in step S6 results in YES, and the processing proceeds to step S8 when a request has been accepted.

In step S8, the CPU 51 of the server 2 determines whether or not a processing termination instruction has been issued. Here, although there is no particular limitation to the processing termination instruction, a power supply interruption of the server 2 is adopted in this embodiment. That is, when the power supply is interrupted at the server 2, the determination in step S8 results in YES, and then the operation-history tampering detection processing at the server 2 is terminated.

Meanwhile, unless the power supply is interrupted at the server 2, the determination in step S8 results in NO. Then, the processing returns to step S1, and the subsequent processing is repeated.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, in the above-described embodiment, operation-history tampering detection utilizes data that is naturally entered by a legitimate user and that cannot be easily entered by a tamperer.

However, without particular limitation to the embodiment, the present invention is generally applicable to applications for general validation of operation history information relating to touch operations. That is, the present invention is widely applicable to validation of touch operations on smartphones, etc., without limitation to games.

Furthermore, for example, although operation history information about taps on the player terminal 1 is used as an example in the above-described embodiment for convenience of description, there is no particular limitation to this example.

Specifically, as described above, when a touch operation is performed on the touchscreen of the player terminal 1, a certain vibration occurs on the player terminal 1. Thus, the present invention can be easily applied to validation of operation history information involving arbitrary combinations of arbitrary kinds of touch operations, such as tap, swipe, and flick.

Furthermore, for example, although an index function obtained by using a model defining the feature quantities of accelerations entered by human users is adopted as information for validating vibration history information in the above-described embodiment, there is no particular limitation to this information, and any information suffices as long as the information serves as an index for determining whether or not a vibration of the player terminal 1 is based on a touch operation performed by a actual person. Such information will hereinafter be referred to as "index information". That is, the index function is an example of index information.

Furthermore, for example, the functional configuration in FIG. 6 is only an example, and there is no particular limitation to this example. That is, it suffices that an information processing device be provided with functions that enable the execution of the above-described series of processing steps as a whole, and the choice of functional blocks for implementing the functions is not particularly limited to the example in FIG. 6. Furthermore, the locations of the functional blocks are not particularly limited to those in FIG. 6 and may be arbitrarily set. For example, the functional blocks of the server 2 may be transferred to the player terminal 1, etc., and conversely, the functional blocks of the terminal 1 may be transferred to the server 2, etc.

Furthermore, each functional block may be implemented by hardware alone, by software alone, or by a combination of hardware and software.

In a case where the processing by each functional block is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player in embedded form in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In other words, an information processing device according to the present invention may be embodied in various forms configured as follows, including the above-described server 2 in FIG. 1.

Specifically, an information processing device according to the present invention carries out communications to send information to and receive information from a terminal (e.g., the player terminal 1 in FIG. 1) configured as follows.

Specifically, the terminal includes:

a first detecting unit (e.g., the vibration detecting unit 31 in FIG. 2) that detects a vibration that occurs on the terminal;

a display unit (e.g., the display unit 27 in FIG. 2) that displays an image on a predetermined display surface;

a second detecting unit (e.g., the touch-operation input unit 26 in FIG. 2) that is laid over the display surface and that detects contact with an object by using a predetermined method; and an executing unit (e.g., the game executing unit 142 in FIG. 6) that executes predetermined processing on the basis of a touch operation performed by bringing the object into contact.

Furthermore, the information processing device according to the present invention includes:

a first obtaining means (e.g., the vibration-information obtaining unit 111 in FIG. 6) for obtaining vibration history information representing a time series of results of detection by the first detecting unit from the terminal;

a second obtaining means (e.g., the operation-information obtaining unit 113 in FIG. 6) for obtaining operation history information representing a time series of touch operations from the terminal; and a first determining means (e.g., the operation-information validity determining unit 114 in FIG. 6) for determining the validity of the operation history information by comparing the operation history information with the vibration history information.

In this way, a method that works effectively even in the case where the tampering detection method has become known to the public or in the case where program code for executing detection itself has been tampered with in operation-history tampering detection is established.

Specifically, the kind of data that is naturally entered by a legitimate user and that cannot be easily entered by a tamperer includes data that is entered by performing an operation of bringing an object into contact (touch operation). Touch operations are generally used operations on smartphones, etc. Thus, an information processing device according to the present invention detects an act of tampering with or otherwise interfering with an operation history (or an act involving such a risk) by checking the validity of events involving generally used touch operations.

Here, in the case where a legitimate user has naturally performed a touch operation on the terminal, a vibration occurs on the terminal. In this case, vibration history information representing time-series results of detection by the first detecting unit is obtained by observing physical phenomena and is difficult to accurately and automatically generate by using a program. Therefore, an information processing device according to the present invention can effectively detect the acts of tampering with or otherwise interfering with operation histories even in the case where the above configuration has been made open to the public and thus the tampering detection method has become known to the public or in the case where program code for executing detection on the terminal side itself has been tampered with.

Furthermore, in the case where an ordinary smartphone is adopted as the terminal, there is no need for an opt-in operation by a user. Specifically, in an ordinary smartphone, since a function for detecting the orientation thereof is implemented as a basic function of the smartphone, an acceleration sensor having high resolution is constantly kept active and cannot be turned off explicitly. By adopting the acceleration sensor as the first detecting unit, it is possible to easily perform tampering detection for information input to all application software executed on the terminal.

Furthermore, as opposed to existing technologies, it is possible to improve the operation-history tampering detection logic on the information processing device side acting as a server, without having to modify the client terminal side in any way. For example, when a new type of smartphone that serves as the terminal is released, it is possible to add an operation-history tampering detection logic in which vibration specific to that type of smartphone is taken into consideration at an arbitrary timing to the information processing device (server) side. Furthermore, by saving vibration history information at the server as big data, it becomes possible to perform operation-history tampering detection by utilizing past data.

More specifically, by adopting the information processing device, it becomes possible to enhance the accuracy of operation-history tampering detection on the information processing device side without requiring continual updating of application software on a terminal having a touchscreen, such as a smartphone.

Specifically, touch operations are used for operating application software that runs on a smartphone. The acts of tampering with information about touch operations to conduct fraud on applications, i.e., the acts of tampering with or otherwise interfering with operation histories, have hitherto been a big problem. In games in particular, the acts of tampering with or otherwise interfering with operation histories by tampering with touch operations so as to easily gain high scores or so as to win in competitions against other players have hitherto been a big problem.

There are already existing methods of detecting the acts of tampering with or otherwise interfering with operation histories by tampering with information about touch operations. With the existing methods, however, it has been necessary to continually update application software on a terminal having a touchscreen, such as a smartphone, or the accuracy of detecting fraud on a client remotely from the server side has not been high.

Specifically, as one type of existing method, methods of detecting alteration of game software by performing memory scanning, etc. are well known. Such existing methods will hereinafter be referred to as "client-side alteration detection methods". With client-side alteration detection methods, cheating is detected by using data that can be easily falsified by a third party, such as executable files or operation histories, users familiar with programming can create programs for bypassing these methods. Thus, in the case where a client-side alteration detection method is adopted, it is necessary to continually update application software as the cheating methods that are used change.

As another type of existing method, there are also network-based cheat detection methods, for example, a method of validating consistency of data sent to a server from a game machine, a smartphone, or the like acting as a client, such as operation information. With network-based cheat detection methods, however, it is necessary to detect cheating on the basis of even less information compared with client-side technologies, and thus bypassing is also easy. Therefore, it is difficult to effectively suppress cheating with a network-based cheat detection method alone, and thus a network-based cheat detection method is often used in combination with a client-side alteration detection method.

As another type of existing method, there are also methods utilizing biometric information. This type of existing method is directed to data that is difficult to falsify and makes it possible to easily distinguish between data output from an illegitimate program and data entered by a actual person. However, since biometric information itself is sensitive privacy information, it is difficult to use biometric information in a tampering detection method for general application software.

From what has been discussed above, in order to realize a fair usage environment for applications or network services, it is essential to realize a tampering detection method that makes it possible to distinguish, with high accuracy, between data output from an illegitimate program and data entered by a actual person by utilizing a non-sensitive information source. As described above, it is possible to realize this with the method employing the information processing device.

Furthermore, the information processing device may further include:

a management means (e.g., the index-function management unit 122 in FIG. 6) for managing index information that serves as an index for determining whether or not the vibration of the terminal is based on a touch operation performed by a actual person; and a second determining means (the vibration-information validity determining unit 112 in FIG. 6) for determining the validity of the vibration history information on the basis of the index information, and the first determining means may permit the execution of the determination of the validity of the operation history information in the case where the vibration history information has been validated and may prohibit the execution of the determination of the validity of the operation history information in the case where the operation history information has not been validated (e.g., the vibration-information validity determining unit 112 in FIG. 6).

As described earlier, the vibration history information representing time-series results of detection by the first detecting unit is obtained by observing physical phenomena and thus is difficult to accurately and automatically generate by using a program; however, it cannot be said that it is impossible. Thus, by further introducing a step of determining the validity of the vibration history information, it becomes possible to more reliably detect fraud, such as the acts of tampering with or otherwise interfering with operation histories.

Here, the information processing device may further include a generating means (e.g., the index-function generating and updating unit 121 in FIG. 6) for generating the index information on the basis of one or more pieces of vibration history information validated in the past.

This enhances the reliability of the index information, which makes it possible to more reliably detect fraud, such as the acts of tampering with or otherwise interfering with operation histories.

Furthermore, as the one or more pieces of vibration history information validated in the past, for example, by accumulating vibration history information of all players on the information processing device (server) side and aggregating the vibration history information for individual types of terminals (smartphones, etc.), it is possible to easily and semi-automatically generate motion big data, such as "a machine learning model of natural vibration history information". Since the motion big data cannot be measured from the outside, it becomes possible to more reliably detect fraud, such as the acts of tampering with or otherwise interfering with operation histories.

REFERENCE SIGNS LIST 1, 1-1 to 1-$m$ Player terminal
2 Server
21 CPU
51 CPU
111 Vibration-information obtaining unit
112 Vibration-information validity determining unit
113 Operation-information obtaining unit
114 Operation-information validity determining unit
121 Index-function generating and updating unit
122 Index-information management unit
131 Index-information DB

The invention claimed is:

1. An information processing device that carries out communications to send information to and receive information from a terminal, the information processing device comprising:
   a first sensor that detects a vibration that occurs on the terminal;
   a display that displays an image on a predetermined display surface;
   a second sensor that is laid over the display surface and that detects a contact with an object by using a predetermined method; and
   a first processor configured to execute a predetermined process based on a touch operation performed by bringing the object into the contact,
   wherein the information processing device further comprises a second processor coupled to a memory, wherein the second processor is configured to:
      obtain vibration history information representing a time series of results of detection by the first sensor from the terminal;
      obtain operation history information representing a time series of touch operations that occur in a game execution environment from the terminal;
      determine a validity of the operation history information by whether the operation history information is different from information regarding a legitimate touch operation physically entered by an actual person,
      wherein the validity of the operation history information is determined by comparing the operation history information with the vibration history information;
      manage index information that serves as an index for determining whether the vibration of the terminal is based on the touch operation performed by an actual person; and
      determine a validity of the vibration history information based on the index information,
      wherein determining the validity of the operation history information comprises:
         permitting an execution of a determination of the validity of the operation history information where the vibration history information has been validated, and
         prohibiting the execution of the determination of the validity of the operation history information where the operation history information has not been validated.

2. The information processing device according to claim 1, wherein the second processor is configured to:
   generate the index information based on one or more pieces of vibration history information validated in the past.

3. The information processing method executed by an information processing device that carries out communications to send information to and receive information from a terminal, the information processing method comprising:
   detecting, by a control processor in the terminal, a vibration that occurs on the terminal;
   displaying, by the control processor, an image on a predetermined display surface;
   detecting, by the control processor, a contact with an object by a predetermined method using a sensor laid over the predetermined display surface;
   executing a predetermined process based on a touch operation performed by bringing the object into the contact;
   obtaining vibration history information representing a time series of results of detection of the vibration;
   obtaining operation history information representing a time series of touch operations that occur in a game execution environment and from the terminal;
   determining a validity of the operation history information by whether the operation history information is different from information on a legitimate touch operation physically entered by an actual person, wherein the validity of the operation history information is determined by comparing the operation history information with the vibration history information;
   managing index information that serves as an index for determining whether the vibration of the terminal is based on the touch operation performed by an actual person; and
   determining a validity of the vibration history information based on the index information,
   wherein determining the validity of the operation history information comprises:
      permitting an execution of a determination of the validity of the operation history information where the vibration history information has been validated, and
      prohibiting the execution of the determination of the validity of the operation history information where the operation history information has not been validated.

4. A non-transitory computer readable medium storing a program for causing a computer to execute control processing, the computer controlling a server that carries out communications to send information to and receive information from a terminal, the program comprising functionality for:
   detecting a vibration that occurs on the terminal;
   displaying an image on a predetermined display surface;

detecting a contact with an object by a predetermined method using a sensor laid over the display surface;

executing a predetermined process based on a touch operation performed by bringing the object into the contact;

obtaining vibration history information representing a time series of results of detection of the vibration;

obtaining operation history information representing a time series of touch operations that occur in a game execution environment and from the terminal;

determining a validity of the operation history information by whether the operation history information is different from information on a legitimate touch operation physically entered by an actual person, wherein the validity of the operation history information is determined by comparing the operation history information with the vibration history information;

managing index information that serves as an index for determining whether the vibration of the terminal is based on the touch operation performed by an actual person; and determining a validity of the vibration history information based on the index information, wherein determining the validity of the operation history information comprises:

permitting an execution of a determination of the validity of the operation history information where the vibration history information has been validated, and prohibiting the execution of the determination of the validity of the operation history information where the operation history information has not been validated.

* * * * *